United States Patent
Oh

(10) Patent No.: US 12,286,135 B2
(45) Date of Patent: Apr. 29, 2025

(54) APPARATUS FOR CONTROLLING AUTONOMOUS DRIVING AND METHOD THEREOF

(71) Applicants: HYUNDAI MOTOR COMPANY, Seoul (KR); KIA CORPORATION, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 407 days.

(21) Appl. No.: 17/741,829

(22) Filed: May 11, 2022

(65) Prior Publication Data
US 2023/0135702 A1   May 4, 2023

(30) Foreign Application Priority Data

Nov. 2, 2021  (KR) .................. 10-2021-0149255

(51) Int. Cl.
*B60W 60/00*   (2020.01)
*B60W 50/00*   (2006.01)

(52) U.S. Cl.
CPC .... *B60W 60/0015* (2020.02); *B60W 50/0098* (2013.01); *B60W 2050/0022* (2013.01); *B60W 2420/403* (2013.01); *B60W 2420/408* (2024.01)

(58) Field of Classification Search
CPC ......... B60W 60/0015; B60W 50/0098; B60W 2050/0022; B60W 2420/403; B60W 2420/408; B60W 30/0953; B60W 60/0011; B60W 30/08; B60W 30/095; B60W 30/0956; B60W 40/02; B60W 50/00; B60W 50/0097
See application file for complete search history.

(56) References Cited

U.S. PATENT DOCUMENTS

| | | | |
|---|---|---|---|
| 2021/0224560 A1* | 7/2021 | Kim | G06F 18/214 |
| 2023/0182728 A1* | 6/2023 | Yamauchi | B60W 30/09 |
| | | | 701/301 |

FOREIGN PATENT DOCUMENTS

KR   102079291 B1 *  2/2020   ............. B60R 21/00

OTHER PUBLICATIONS

"Optical flow" from Wikipedia, Apr. 17, 2021, downloaded from Wayback Machine (Year: 2021).*

(Continued)

*Primary Examiner* — Michael V Kerrigan
*Assistant Examiner* — Tanya C Sienko
(74) *Attorney, Agent, or Firm* — Lempia Summerfield Katz LLC

(57) ABSTRACT

Disclosed are an autonomous driving control apparatus for controlling autonomous driving based on feature points of another vehicle, and a method thereof. The autonomous driving control apparatus may obtain information about a surrounding object, may extract one or more feature points corresponding to the object through the information about the surrounding object, may determine whether there is a risk of collision with the surrounding object based on the extracted feature point, and may control autonomous driving of the autonomous vehicle in consideration of the surrounding object having the risk of collision with the autonomous vehicle.

20 Claims, 10 Drawing Sheets

(56) References Cited

OTHER PUBLICATIONS

"Vehicle Distance Estimation Method Based on Monocular Camera" T.Tseng etc. 2020 International Symposium on Computer, Consumer and Control. (Year: 2020).*
Machine translation of KR 10-2079291 B1 off ip.com downloaded Aug. 24, 2024 (Year: 2024).*
"Looking at Vehicles on the Road: A Survey of Vision-Based Vehicle Detection, Tracking, and Behavior Analysis" S. Sivaraman, et al. IEEE Transactions on Intelligent Transportation Systems, vol. 14, No. 4, Dec. 2013 (Year: 2013).*
"Vehicle Detection Techniques for Collision Avoidance Systems: A Review" by A. Mukhtar et al., IEEE Transactions on Intelligent Transportation Systems, vol. 16, No. 5, Oct. 2015 (Year: 2015).*

\* cited by examiner

APPARATUS FOR CONTROLLING AUTONOMOUS DRIVING AND METHOD THEREOF

CROSS-REFERENCE TO RELATED APPLICATION

This application claims the benefit of and priority to Korean Patent Application No. 10-2021-0149255, filed in the Korean Intellectual Property Office on Nov. 2, 2021, the entire contents of which are incorporated herein by reference.

TECHNICAL FIELD

The present disclosure relates to an autonomous driving control apparatus for controlling autonomous driving and a method thereof.

BACKGROUND

The statements in this section merely provide background information related to the present disclosure and may not constitute prior art.

Autonomous driving vehicles require the ability to adaptively respond to surrounding situations that change in real time while the autonomous driving vehicles are driving.

First of all, a reliable determination control function is desired to produce autonomous driving vehicles.

A semi-autonomous vehicle, which has been recently released, basically performs driving, braking, and steering instead of a driver, thereby reducing the driver's fatigue.

For semi-autonomous driving, unlike fully autonomous driving, a driver needs to keep his/her concentration on driving, such as holding a steering wheel continuously.

Nowadays, the semi-autonomous vehicle may be equipped with a highway driving assist (HDA) function, a driver status warning (DSW) function that outputs a warning alarm through a cluster, or the like by determining status abnormalities and the driver's negligence such as drowsy driving and taking eyes off the road (namely, the driver's eyes are not directed to the road), a driver awareness warning (DAW) function that determines whether a vehicle is unsafely driving such as a case that a vehicle is crossing the lane, through a front camera, and a forward collision-avoidance assist (FCA) or active emergency brake system (AEBS) function that performs sudden braking when a forward collision is detected; and, the autonomous vehicle may be on sale.

However, we have discovered that when a conventional autonomous driving system controls autonomous driving by using precise map information, it is difficult to implement appropriate autonomous driving in a space where there is no line or precise map information.

SUMMARY

The present disclosure has been made to solve the above-mentioned problems occurring in the prior art while advantages achieved by the prior art are maintained intact.

An aspect of the present disclosure provides an autonomous driving control apparatus that controls autonomous driving based on feature points of another vehicle, and a method thereof.

An aspect of the present disclosure provides an autonomous driving control apparatus that solves an issue in which existing dynamics information and precise map matching information disappear and normal determination is not made when objects in the blind spot of a LiDAR sensor or in an area adjacent to the blind spot are separated or merged with each other, and a method thereof.

An aspect of the present disclosure provides an autonomous driving control apparatus, which is capable of controlling autonomous driving along a safe route in response to driving in cases where it is impossible to rely on a precise map, for example, a free space, a construction/accident section, and the like, and a method thereof.

An aspect of the present disclosure provides an autonomous driving control apparatus, which performs autonomous driving by reducing complex calculations without using precise map matching and quickly responding to emergency situations, or the like without delay, and a method thereof.

An aspect of the present disclosure provides an autonomous driving control apparatus, which complementarily enhance the completeness of autonomous driving by combining the existing autonomous driving logic, a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an autonomous driving control apparatus may include a sensor included in an autonomous vehicle and obtaining information about a surrounding object in the area adjacent to the autonomous vehicle. The autonomous driving control apparatus may further include a controller that extracts one or more feature points corresponding to the object through the information about the object, determines whether there is a risk of collision with the object, based on the extracted feature point, and controls autonomous driving of the autonomous vehicle in consideration of the object in which the risk of collision is present.

In an embodiment, the controller may extract two or more feature points, which correspond to the object, from among the one or more feature points, may calculate an angle between the two or more feature points based on a current location of the autonomous vehicle or a point on a planned driving route line of the autonomous vehicle. The controller may further determine whether there is the risk of collision with the object, based on the calculated angle.

In an embodiment, the controller may extract the one or more feature points of the object through the information about the object based on displacement over time of the one or more feature points, such that the one or more feature points, which are determined to be easy to trace and which are uniquely identified, are selected.

In an embodiment, the sensor may obtain the information about the object through at least one sensor among a camera, a lidar, or radar.

In an embodiment, the controller may extract the one or more feature points of the object by fusing the information about the object obtained through two or more sensors included in the sensor.

In an embodiment, the controller may calculate an occupancy angle weight based on a weight corresponding to a predetermined angle section with respect to a driving direction of the autonomous vehicle and a section occupied by the calculated angle, at the current location of the autonomous vehicle or at the point on the planned driving route line of the autonomous vehicle and may determine whether there is the risk of collision with the object, based on the occupancy angle weight and the calculated angle.

In an embodiment, the controller may calculate a weight corresponding to one predetermined angle section as the occupancy angle weight when the section occupied by the calculated angle is included in the one predetermined angle section. And the controller may calculate a weight corresponding to a predetermined angle section including a line bisecting an angle between the two or more feature points as the occupancy angle weight with respect to the current location of the autonomous vehicle or the point on the planned driving route line of the autonomous vehicle, when the section occupied by the calculated angle spans two or more predetermined angle sections.

In an embodiment, the controller may determine whether there is the risk of collision with the object, based on a value obtained by multiplying the occupancy angle weight and the calculated angle.

In an embodiment, the controller may calculate the angle between the two or more feature points based on a state where the autonomous vehicle is away from the object by a specific distance to the object on the planned driving route line.

In an embodiment, the controller may determine whether the object is an object in which the risk of collision is present, in consideration of time to collision (TTC) for the object.

In an embodiment, the controller may determine that the object, of which the risk of collision calculated based on the occupancy angle weight and the calculated angle exceeds a threshold value and of which TTC is less than a threshold time, is an object in which the risk of collision is present.

In an embodiment, the controller may control autonomous driving of the autonomous vehicle by generating an autonomous route that minimizes the risk of collision of the object calculated based on the occupancy angle weight and the calculated angle.

According to an aspect of the present disclosure, an autonomous driving control method may include: obtaining, by a sensor provided in an autonomous vehicle, information about a surrounding object, extracting, by a controller, one or more feature points corresponding to the object through the information about the object, determining, by the controller, whether there is a risk of collision with the object, based on the extracted feature points, and controlling, by the controller, autonomous driving of the autonomous vehicle in consideration of the object in which the risk of collision is present.

In an embodiment, the extracting, by the controller, of the one or more feature points corresponding to the object through the information about the object may include extracting, by the controller, two or more feature points, which correspond to the object, from among the one or more feature points. The determining, by the controller, of whether there is the risk of collision with the object, based on the extracted feature points may include calculating, by the controller, an angle between the two or more feature points based on a current location of the autonomous vehicle or a point on a planned driving route line of the autonomous vehicle and determining, by the controller, whether there is the risk of collision with the object, based on the calculated angle.

In an embodiment, the extracting, by the controller, of the one or more feature points corresponding to the object through the information about the object may include extracting, by the controller, the one or more feature points of the object through the information about the object based on displacement over time of the one or more feature points, such that the one or more feature points, which are determined to be easy to trace and which are uniquely identified, are selected.

In an embodiment, the determining, by the controller, of whether there is the risk of collision with the object, based on the calculated angle may include calculating, by the controller, an occupancy angle weight based on a weight corresponding to a predetermined angle section with respect to a driving direction of the autonomous vehicle and a section occupied by the calculated angle, at the current location of the autonomous vehicle or at the point on the planned driving route line of the autonomous vehicle and determining, by the controller, whether there is the risk of collision with the object, based on the occupancy angle weight and the calculated angle.

In an embodiment, the calculating, by the controller, of the occupancy angle weight may include calculating, by the controller, a weight corresponding to one predetermined angle section as the occupancy angle weight when the section occupied by the calculated angle is included in the one predetermined angle section and calculating, by the controller, a weight corresponding to a predetermined angle section including a line bisecting an angle between the two or more feature points as the occupancy angle weight with respect to the current location of the autonomous vehicle or the point on the planned driving route line of the autonomous vehicle, when the section occupied by the calculated angle spans two or more predetermined angle sections.

In an embodiment, the determining, by the controller, of whether there is the risk of collision with the object, based on the extracted feature points may include determining, by the controller, whether the object is an object in which the risk of collision is present, in consideration of TTC for the object.

In an embodiment, the determining, by the controller, of whether there is the risk of collision with the object, based on the occupancy angle weight and the calculated angle may include determining, by the controller, the object, of which the risk of collision calculated based on the occupancy angle weight and the calculated angle exceeds a threshold value and of which TTC is less than a threshold time, as an object in which the risk of collision is present.

In an embodiment, the method may further include controlling, by the controller, autonomous driving of the autonomous vehicle by generating an autonomous route that minimizes the risk of collision of the object calculated based on the occupancy angle weight and the calculated angle.

BRIEF DESCRIPTION OF THE DRAWINGS

The above and other objects, features and advantages of the present disclosure should be more apparent from the following detailed description taken in conjunction with the accompanying drawings.

Figure 1:
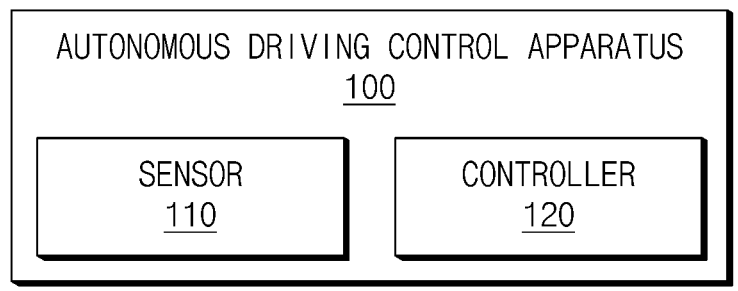
FIG. 1 is a block diagram illustrating an autonomous driving control apparatus, according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations are omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It should be understood that terms used herein should be interpreted as having a meaning that is consistent with their meaning in the context of the present disclosure and the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

Hereinafter, various embodiments of the present disclosure are described in detail with reference to FIGS. 1 to 9.

FIG. 1 is a block diagram illustrating an autonomous driving control apparatus, according to an embodiment of the present disclosure.

Referring to FIG. 1, an autonomous driving control apparatus 100 may include a sensor 110 and a controller 120.

According to an embodiment of the present disclosure, the autonomous driving control apparatus 100 may be implemented inside or outside of a vehicle. In one form, the autonomous driving control apparatus 100 may be integrated with internal control units of a vehicle and may be implemented with a separate hardware device so as to be connected to control units of the vehicle by means of a connection means.

For example, the autonomous driving control apparatus 100 may be implemented integrally with a vehicle or may be implemented in a form installed/attached to the vehicle as a configuration separate from the vehicle. Alternatively, a part of the autonomous driving control apparatus 100 may be implemented integrally with the vehicle, and the other parts may be implemented in a form installed/attached to the vehicle as a configuration separate from the vehicle.

The sensor 110 may be provided in an autonomous vehicle so as to obtain information about surrounding objects in an area adjacent to the autonomous vehicle.

For example, the sensor 110 may obtain information about a surrounding object(s) through at least one sensor among a camera, lidar, and radar.

For example, the sensor 110 may obtain images around the autonomous vehicle through the camera.

For example, the sensor 110 may obtain point cloud information through the lidar.

For example, the sensor 110 may obtain the distance to an object and the direction of the object through the radar.

The controller 120 may extract at least one feature point corresponding to an object through information about the object.

For example, the controller 120 may extract two or more feature points corresponding to an object.

For example, the controller 120 may extract feature points of an object through the information about the object based on displacement over time of a feature point, such that the feature point that is determined to be easy to trace and which is uniquely identified, is selected.

For example, the controller 120 may extract a point having relatively-small displacement over time as a feature point based on raw data obtained through a sensor.

For example, the controller 120 may extract a point, at which data corresponding to a feature point is not redundant in a data distribution (a contour point distribution, an object shape, or the like), as a feature point such that other points having similar shapes are not selected on the object.

For example, the controller 120 may extract the feature point of an object by fusing information about the object obtained through two or more sensors included in the sensor 110.

For example, the controller 120 may extract feature points by analyzing information in a form of fusion of data, which is associated with the same object and which is obtained through two or more of a camera, lidar and radar.

For example, when information, which is obtained by fusing information about an object obtained through two or more sensors, satisfies traceability and uniqueness, the controller 120 may extract the feature point of the object through the fused information.

For example, when the sensor 110 uses information obtained through the camera, the controller 120 may extract a feature point, which is distinguished from other portions even after a location of the object in an image is changed and has the smallest displacement over time, from the obtained image.

For example, when the sensor 110 uses information obtained through the lidar, the controller 120 may extract feature points, of which the distribution is unique and which are easy to trace due to the smallest change over time, from among a set of points having a unique distribution, in consideration of the movement of an object at a cloud point level.

For example, when the sensor 110 uses information obtained through the radar, the controller 120 may extract a feature point, which has a location and velocity, at which it is assured that a location change of the longitudinal location data is the same object, and at which the location change obtained through dead reckoning through integration of a longitudinal velocity vector may explain the movement of the same object, in consideration of an accurate longitudinal resolution.

The controller 120 may determine whether there is a risk of collision with an object, based on the extracted feature point.

For example, the controller 120 may calculate an angle between two or more feature points based on an autonomous vehicle's current location or a point on a planned driving route line of the autonomous vehicle.

For example, the controller 120 may obtain an angle at which two or more feature points of the same object occupy a current location of the autonomous vehicle or a point on the planned driving route line of the autonomous vehicle as a reference point.

For example, the controller 120 may determine whether there is a risk of collision with an object, based on the calculated angle.

For example, as the angle at which two or more feature points of the same object occupy a current location of the autonomous vehicle or a point on the planned driving route line of the autonomous vehicle as a reference point increases, the controller 120 may determine that there is a risk of collision with an object, because the object is close to the autonomous vehicle.

For example, the controller 120 may calculate a planned driving route line corresponding to a driving direction of the autonomous vehicle.

For example, the controller 120 may calculate the planned driving route line corresponding to the driving direction for the future location of the vehicle in consideration of the autonomous vehicle's driving route.

For example, when the autonomous vehicle's driving route corresponds to a straight line, the controller 120 may calculate the straight line in the current autonomous vehicle's traveling direction as a planned driving reference line.

In this case, the controller 120 does not perform calculations that take into account a change in the autonomous vehicle's traveling direction, and thus may benefit from the calculation process.

For example, when the autonomous vehicle's driving route is curved, the controller 120 may calculate a planned driving route line in consideration of the change in the traveling direction of autonomous vehicle.

For example, the controller 120 may calculate a planned driving route line based on the traveling direction of the vehicle traveling on the driving route through line information grasped by the camera or precise map information of an autonomous driving system.

In detail, the controller 120 may basically determine the traveling direction of the driving vehicle on a driving route through line information determined through the camera, and may calculate a reference line by selectively using the precise map information, thereby reducing computational loads.

For example, the controller 120 may determine a change in the traveling direction of the autonomous vehicle based on a line connecting the center of lines.

For example, assuming that a location of a left line where the autonomous vehicle is driving according to time is $\tau_{LeftLS}(t)$, and a location of a right line where the autonomous vehicle is driving according to time is $\tau_{RightLS}(t)$, the controller 120 may determine a change in the traveling direction of the autonomous vehicle through following Equation 1.

$$\text{Traveling direction reference angle} = \tau'_{LeftLS}(t_1) + \tau'_{RightLS}(t_1/2) \quad \text{[Equation 1]}$$

Here, $\tau'_{LeftLS}(t_1)$ may denote a direction of a left line on a future driving route at time t1 as an angle. $\tau'_{RightLS}(t_1)$ may denote a direction of a right line on a future driving route at time t1 as an angle.

For example, the controller 120 may calculate an angle between two or more feature points based on a location of the autonomous vehicle that is away from the object by a specific distance to an object on a planned driving route.

For example, the controller 120 may calculate an occupancy angle weight based on a weight corresponding to a predetermined angle section with respect to the autonomous vehicle's driving direction and a section occupied by the calculated angle, at the autonomous vehicle's current location or at a point on the autonomous vehicle's driving route line, and may determine whether there is a risk of collision with an object, based on the occupancy angle weight and the calculated angle.

For example, as a predetermined angle section is close to the autonomous vehicle's current location or at a point on the autonomous vehicle's driving route line in the autonomous vehicle's driving direction, the controller 120 may determine to have a high risk of collision because an object is located on the autonomous vehicle's driving route.

For example, when a section occupied by the calculated angle is included in one predetermined angle section, the controller 120 may calculate a weight corresponding to the one predetermined angle section as an occupancy angle weight. When the section occupied by the calculated angle spans two or more predetermined angle sections, the controller 120 may calculate a weight corresponding to a predetermined angle section including a line bisecting an angle between two or more feature points as an occupancy angle weight based on the autonomous vehicle's current location or a point on the autonomous vehicle's planned driving route line.

For example, the controller 120 may determine whether the object is an object with a risk of collision in consideration of time to collision (TTC) for an object.

For example, the controller 120 may calculate the collision reference point, which is an orthographic projection of the nearest point, from among points constituting an object on a reference line and may calculate TTC through a period during which the autonomous vehicle drives to the collision reference point.

For example, the controller 120 may determine that the risk of collision increases as the TTC for the object decreases.

For example, the controller 120 may determine whether the object is an object with a risk of collision, depending on the risk of collision with the object calculated based on the occupancy angle weight and the calculated angle.

For example, when the calculated risk of collision exceeds a threshold value, the controller 120 may determine that there is a risk of collision with an object.

The controller 120 may control autonomous vehicle's autonomous driving in consideration of the object with the risk of collision.

For example, the controller 120 may control autonomous vehicle's autonomous driving by generating an autonomous route that minimizes the risk of collision with the object calculated based on the occupancy angle weight and the calculated angle.

Figure 2:
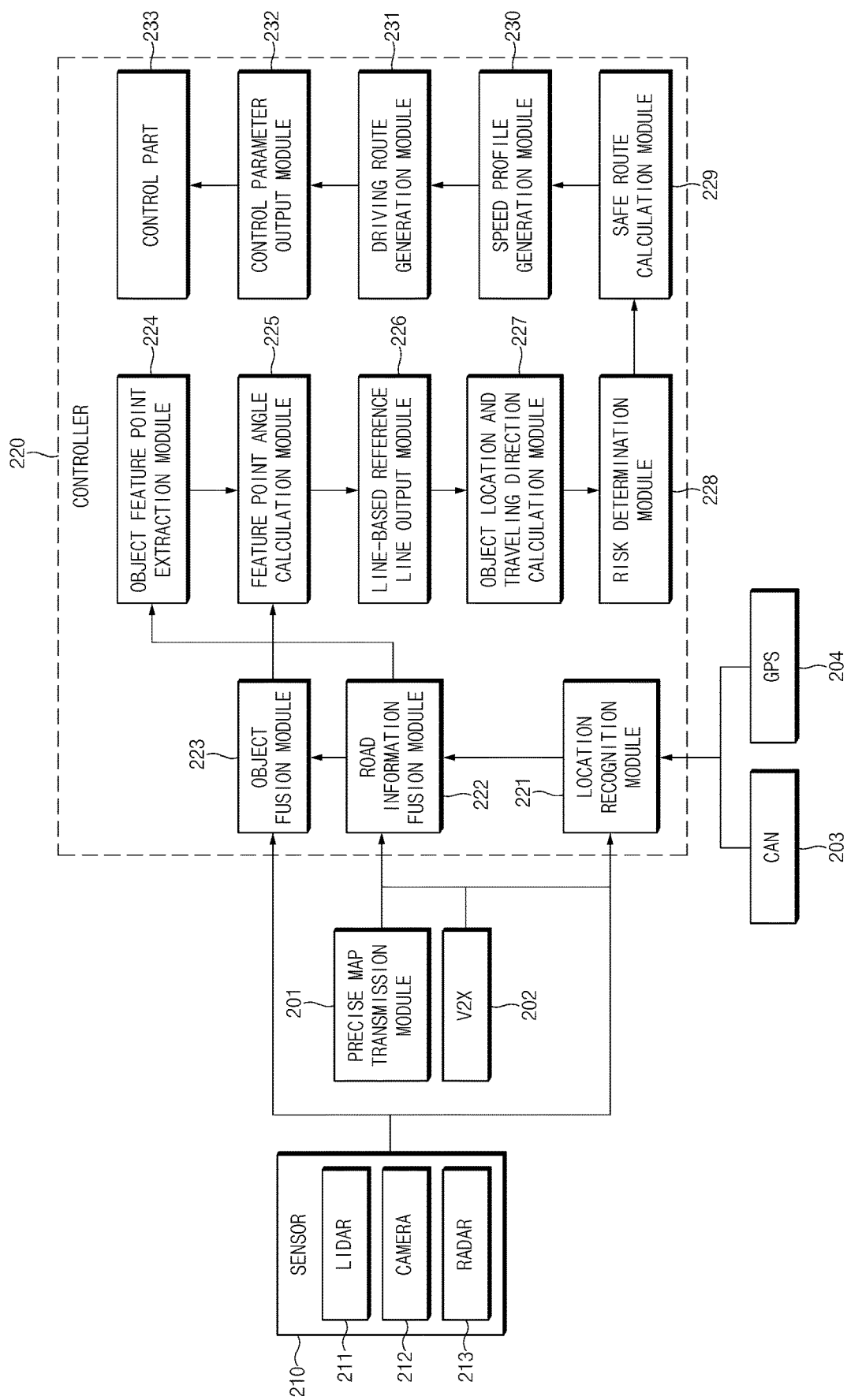
FIG. 2 is a diagram specifically illustrating a configuration of an autonomous driving control apparatus, according to an embodiment of the present disclosure.

FIG. 2 is a diagram specifically illustrating a configuration of an autonomous driving control apparatus, according to an embodiment of the present disclosure.

Referring to FIG. 2, a sensor 210 may include a lidar 211, a camera 212 and radar 213.

For example, the sensor 210 may detect information about at least one of cloud pointer information about an object, image information, or location and direction of the object through at least one of the lidar 211, the camera 212, or the radar 213.

For example, the sensor 210 may transmit information about the detected object to a location recognition module 221 and an object fusion module 223.

A controller 220 may be directly or indirectly connected to transmit and receive various types of information through wireless or wired communication with a precise map transmission module 201, a vehicle to everything (V2X) communication module 202, a controller area network (CAN) communication module 203, and a global positioning system (GPS) 204 of an autonomous vehicle.

The controller 220 may include the location recognition module 221, a road information fusion module 222, the object fusion module 223, an object feature point extraction module 224, a feature point angle calculation module 225, a line-based reference line output module 226, an object location and traveling direction calculation module 227, a risk determination module 228, a safe route calculation module 229, a speed profile generation module 230, a driving route generation module 231, a control parameter output module 232, and a control part 233.

The precise map transmission module 201 may be included in the autonomous vehicle's autonomous driving system so as to transmit information about a precise map of a space, in which a vehicle is driving, to the road information fusion module 222 and the location recognition module 221.

The V2X communication module 202 may transmit road information, location information of another vehicle, or precise map information, which are received through another vehicle or a communication device, to the location recognition module 221 and the road information fusion module 222.

The CAN communication module 203 may transmit information about a location of an autonomous vehicle obtained through the GPS 204 to the location recognition module 221.

The GPS 204 may transmit the information about the location of the autonomous vehicle to the location recognition module 221.

The location recognition module 221 may identify a precise location of an autonomous vehicle based on information obtained through the precise map transmission module 201, the V2X 202, the CAN communication module 203, and the GPS 204 and the sensor 210 and then may transmit information about the precise location of the autonomous vehicle and reliability information about location recognition to the road information fusion module 222.

The road information fusion module 222 may transmit line information of the driving autonomous vehicle, which is detected by the line recognition camera, to the object feature point extraction module 224.

The road information fusion module 222 may transmit information about a surrounding precise map of the autonomous vehicle to the object fusion module 223.

The object fusion module 223 may calculate and output a relative location of an object with respect to the autonomous vehicle based on information detected by the sensor 210, line recognition camera, or precise map information and then may transmit information about a location of the object to the feature point angle calculation module 225.

The object feature point extraction module 224 may extract a feature point, for which tracking and identification of an object are easy, and then may transmit information about the extracted feature point to the feature point angle calculation module 225.

The feature point angle calculation module 225 may calculate an angle between extracted feature points based on the traveling direction of the autonomous vehicle and then may transmit the calculated angle to the line-based reference line output module 226.

The line-based reference line output module 226 may utilize line information obtained through the camera or line information obtained through the precise map, may calculate a reference line corresponding to the traveling direction of an autonomous vehicle in consideration of the autonomous vehicle's driving route, and may transmit information about the calculated reference line to the object location and traveling direction calculation module 227.

The object location and traveling direction calculation module 227 may determine the location of an object based on the angle between the reference line and a line connecting the object's feature point to the autonomous vehicle.

The object location and traveling direction calculation module 227 may calculate the traveling direction of an object based on the change in an angle between the feature points of the object by using the location of the autonomous vehicle as the reference point.

The object location and traveling direction calculation module 227 may transmit information about the location and traveling direction of the object to the risk determination module 228.

The risk determination module 228 may determine a risk of collision with an object based on an angle between the reference line and a line connecting the object's feature point to the autonomous vehicle, an angle between the feature points of the object by using the autonomous vehicle's current location or a point on the autonomous vehicle's planned driving route line as a reference point, a location of the object, information about a traveling direction, and TTC, and then may transmit information about the risk of collision with the object to the safe route calculation module 229.

The safe route calculation module 229 may calculate a safe route, which minimizes a risk, based on the feature points of objects in a drivable region in consideration of an object determined to be dangerous and then may transmit information about the calculated safe route to the speed profile generation module 230.

The speed profile generation module 230 may calculate a speed profile, which is capable of following the calculated safe route, and then may transmit information about the speed profile to the driving route generation module 231.

The driving route generation module 231 may calculate a final driving route, which is determined to be most suitable during driving, based on the safe route and the speed profile and then may transmit information about the final driving route to the control parameter output module 232.

The control parameter output module 232 may output a control parameter for autonomous driving control and may transmit the control parameter to the control part 233.

The control part 233 may control autonomous driving depending on the received control parameter.

Figure 3:
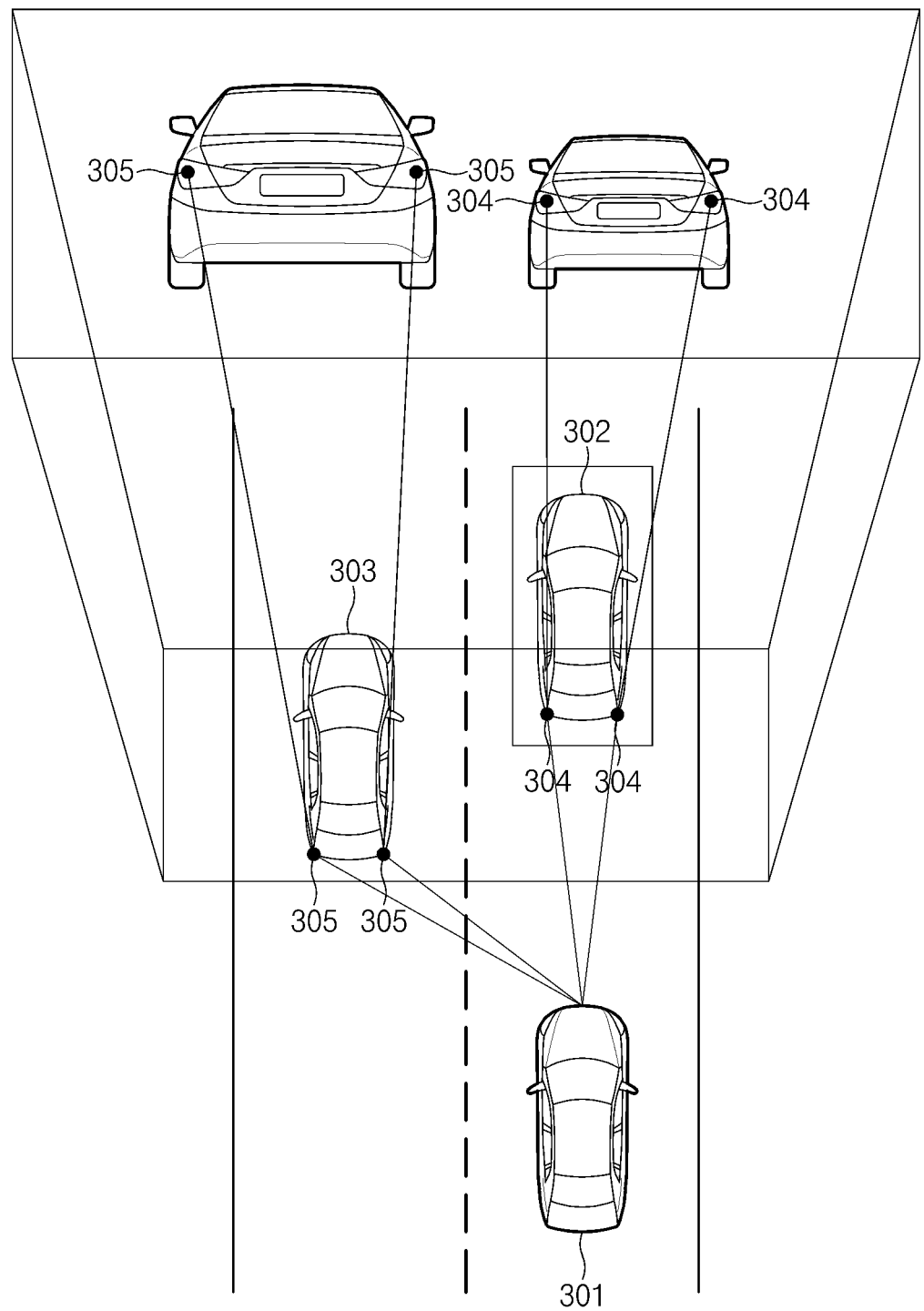
FIG. 3 is a diagram illustrating that an autonomous driving control apparatus extracts one or more feature points corresponding to a surrounding object, according to an embodiment of the present disclosure.

FIG. 3 is a diagram illustrating that an autonomous driving control apparatus extracts a feature point corresponding to a surrounding object, according to an embodiment of the present disclosure.

An autonomous vehicle 301 may extract feature points of a first object 302 and a second object 303 based on information about a surrounding object obtained through a sensor included in the autonomous driving control apparatus 100.

For example, through the autonomous driving control apparatus 100, the autonomous vehicle 301 may extract two or more feature points 304 of the first object 302 and may extract two or more feature points 305 of the second object 303.

For example, the autonomous vehicle 301 may extract feature points having uniqueness and traceability through the autonomous driving control apparatus 100.

For example, when the autonomous driving control apparatus 100 uses information obtained through the camera, the autonomous driving control apparatus 100 included in the autonomous vehicle 301 may extract a feature point, which is distinguished from another portion so as to have the uniqueness even after a location of the object in an image is changed and has the traceability because the feature point has the smallest displacement over time, from the obtained image.

For example, when the autonomous driving control apparatus 100 uses information obtained through the lidar, the autonomous driving control apparatus 100 included in the autonomous vehicle 301 may extract feature points, of which the distribution is unique so as to have the uniqueness and which have the traceability due to the smallest change over time, from among a set of points having a unique distribution, in consideration of the movement of an object at a cloud point level.

For example, when the autonomous driving control apparatus 100 uses information obtained through the radar, the autonomous driving control apparatus 100 included in the autonomous vehicle 301 may extract a feature point, which has a location and velocity, at which it is assured that a location change of the longitudinal location data is the same object, and at which the location change obtained through dead reckoning through integration of a longitudinal velocity vector may explain the movement of the same object, in consideration of an accurate longitudinal resolution.

Figure 4A:
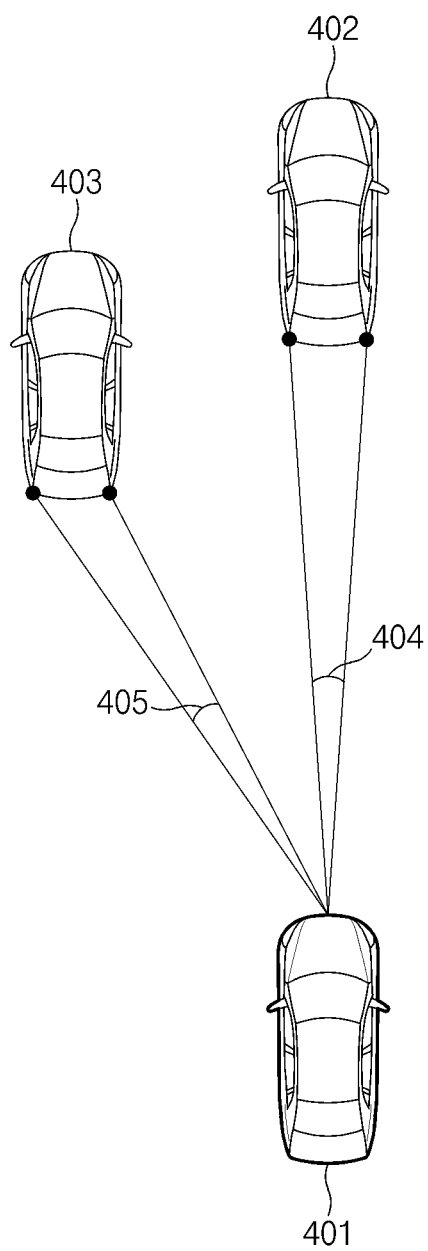
FIGS. 4A and 4B are diagrams illustrating an angle between two or more feature points calculated by an autonomous driving control apparatus, according to an embodiment of the present disclosure.
Figure 4B:
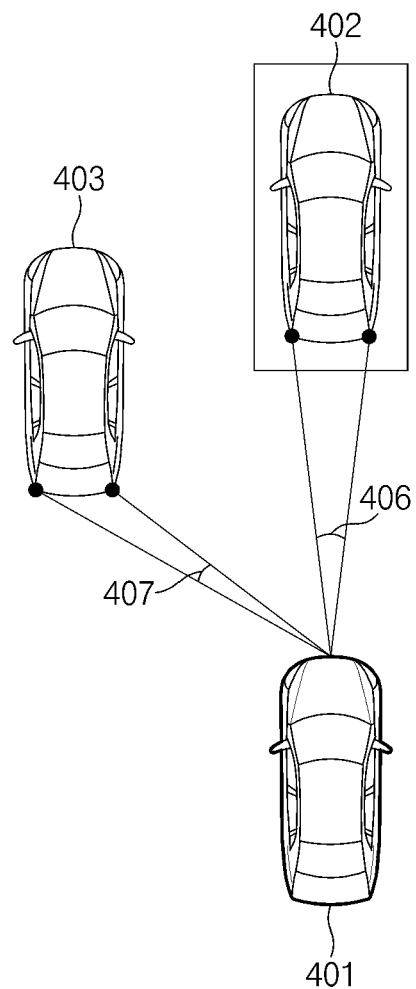

FIGS. 4A and 4B are diagrams illustrating an angle between two or more feature points calculated by an autonomous driving control apparatus, according to an embodiment of the present disclosure.

Referring to FIG. 4A, on the basis of a current location of the autonomous vehicle 401 or a point on a planned driving route line of the autonomous vehicle 401, the autonomous driving control apparatus 100 included in the autonomous vehicle 401 may calculate an angle 404 between two feature points of a first object 402 and may calculate an angle 405 between two feature points of a second object 403.

The autonomous driving control apparatus 100 included in the autonomous vehicle 401 may determine whether a risk of collision with the first object 402 is present, based on the angle 404 between two feature points of the first object 402 and may determine whether a risk of collision with the second object 403 is present, based on the angle 405 between two feature points of the second object 403.

For example, because the object gets close to the autonomous vehicle 401 as the angle between the object's feature points increases, the autonomous driving control apparatus 100 included in the autonomous vehicle 401 may determine that a risk of collision is high.

Referring to FIG. 4B, the autonomous driving control apparatus 100 included in the autonomous vehicle 401 may calculate an angle 406 between two feature points of the first object 402 and may calculate an angle 407 between two feature points of the second object 403.

Because the change in the angle 406 between two feature points of the first object 402 present in a traveling direction line of the autonomous vehicle 401 is great, when the first object 402 is close to the autonomous vehicle 401, the autonomous driving control apparatus 100 included in the autonomous vehicle 401 may determine that there is a risk of collision with the first object 402.

Because the change in the angle 407 between two feature points of the second object 403 that are not present in a traveling direction line of the autonomous vehicle 401 is not great, when the second object 403 is close to the autonomous vehicle 401, the autonomous driving control apparatus 100 included in the autonomous vehicle 401 may determine that there is not a risk of collision with the second object 403.

Figure 5:
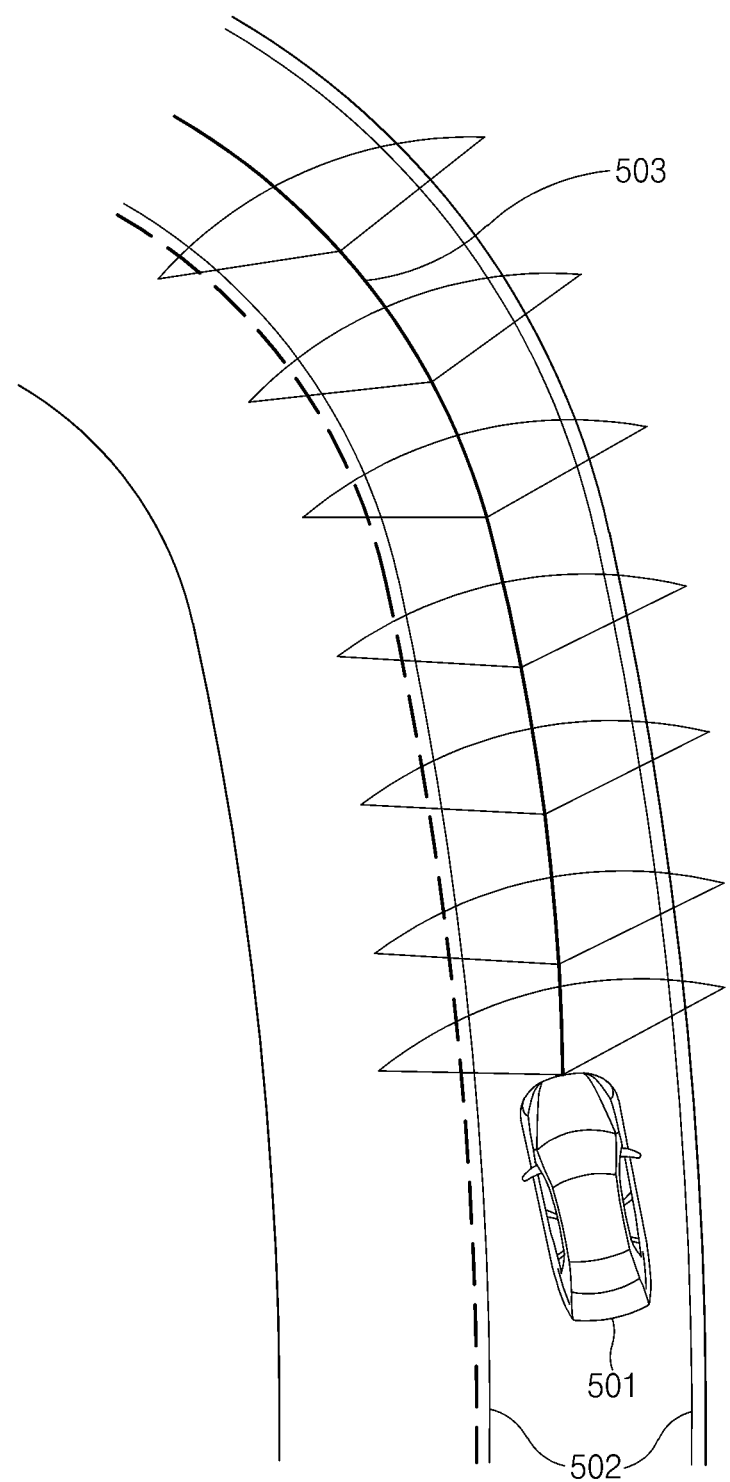
FIG. 5 is a diagram illustrating that an autonomous driving control apparatus calculates a reference line while a vehicle is driving on a curved road, according to an embodiment of the present disclosure.

FIG. 5 is a diagram illustrating that an autonomous driving control apparatus calculates a reference line while a vehicle is driving on a curved road, according to an embodiment of the present disclosure.

The autonomous driving control apparatus 100 included in an autonomous vehicle 501 may obtain information about surrounding lines 502 of the autonomous vehicle 501 through a camera.

The autonomous driving control apparatus 100 included in the autonomous vehicle 501 may calculate a planned driving route line 503 corresponding to a driving route of a vehicle based on the information about the surrounding lines 502 obtained through the camera.

For example, the autonomous driving control apparatus 100 included in the autonomous vehicle 501 may obtain information about the surrounding lines 502 by selectively using precise map information together with line information obtained through the camera.

To determine whether there is a risk of collision with an object in front of the autonomous vehicle 501, the autonomous driving control apparatus 100 included in the autonomous vehicle 501 may determine the location of an object according to the driving of the autonomous vehicle 501 at a future time point.

For example, the autonomous driving control apparatus 100 included in the autonomous vehicle 501 may calculate the planned driving route line 503 corresponding to the driving direction of the autonomous vehicle based on a line connecting the center of the surrounding lines 502.

For example, the autonomous driving control apparatus 100 included in the autonomous vehicle 501 may calculate a point, which is present on a line connecting the reference line and is away from the object by a predetermined specific distance.

For example, the autonomous driving control apparatus 100 included in the autonomous vehicle 501 may calculate an angle formed by the reference line corresponding to the traveling direction of the autonomous vehicle 501 and a line connecting a feature point of an object to the calculated point.

For example, the autonomous driving control apparatus 100 included in the autonomous vehicle 501 may calculate a risk of collision with an object based on the calculated angle and may determine whether there is a risk of collision with an object, based on the risk of collision.

Figure 6:
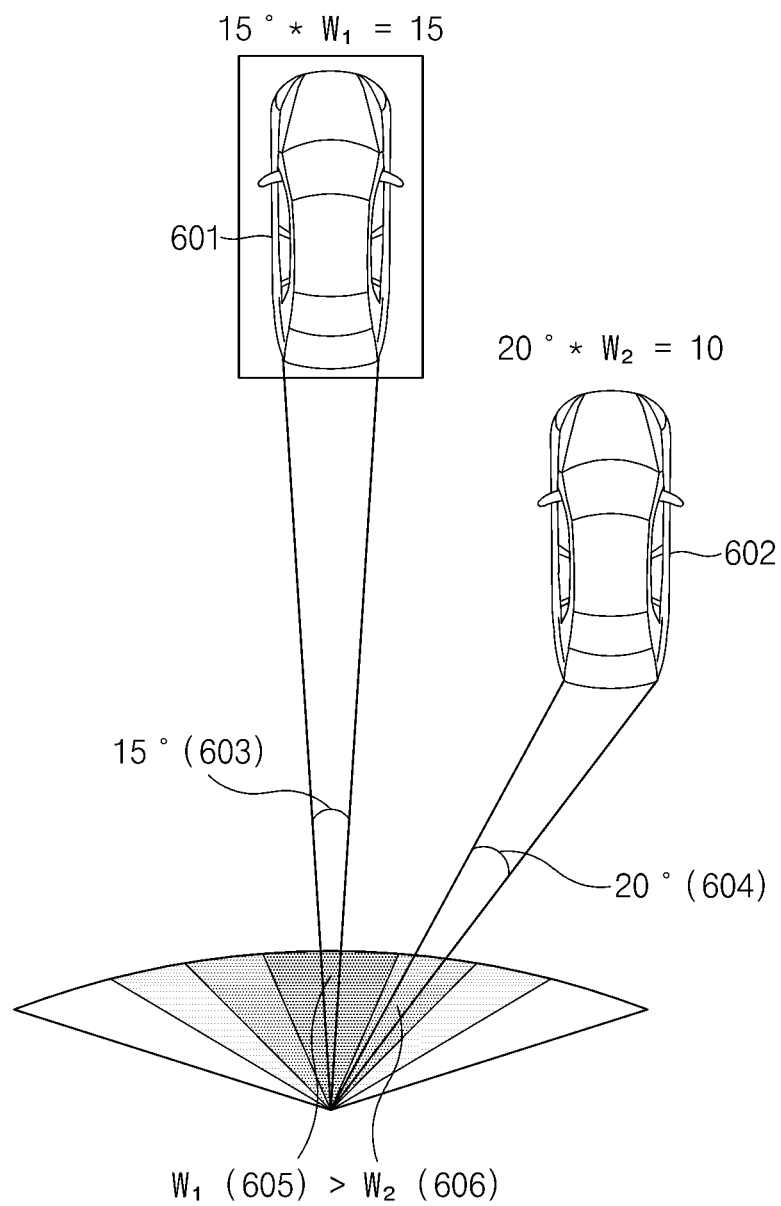
FIG. 6 is a diagram illustrating that an autonomous driving control apparatus calculates a risk of collision with an object, according to an embodiment of the present disclosure.

FIG. 6 is a diagram illustrating that an autonomous driving control apparatus calculates a risk of collision with an object, according to an embodiment of the present disclosure.

Referring to FIG. 6, the autonomous driving control apparatus 100 may calculate an angle 603 between two feature points of a first object 601 and an angle 604 between two feature points of a second object 602.

Furthermore, the autonomous driving control apparatus 100 may calculate an occupancy angle weight (605, 606) based on a weight corresponding to a predetermined angle section with respect to the driving direction of an autonomous vehicle and a section occupied by the calculated angle, at the autonomous vehicle's current location or at a point on the autonomous vehicle's driving route line.

The angle section between lines connecting the feature points of the first object 601 to the autonomous vehicle may be included in a first angle section, and thus the autonomous driving control apparatus 100 may calculate a W_1 605 corresponding to the angle section as an occupancy angle weight of the first object 601.

The angle section between lines connecting the feature points of the second object 602 to the autonomous vehicle may be included in a second angle section, and thus the autonomous driving control apparatus 100 may calculate a W_2 606 corresponding to the angle section as an occupancy angle weight of the second object 602.

The autonomous driving control apparatus 100 may calculate a risk of collision with an object by multiplying the angle between two feature points on the object and the occupancy angle weight.

For example, a weight corresponding to the predetermined angle section based on the driving direction may be set to gradually decrease for each specific angle interval based on the driving direction.

For example, when the angle 603 between the two feature points of the first object 601 is 15 degrees, and $W_1$, which is a weight calculated based on a section occupied by the angle calculated for the feature points of the first object 601 and a weight corresponding to a predetermined angle section with respect to the driving direction of the autonomous vehicle, is 1, the autonomous driving control apparatus 100 may calculate a risk of collision with the first object 601 as "15*1=15".

For example, when the angle 604 between the two feature points of the second object 602 is 20 degrees, and $W_2$, which is a weight calculated based on a section occupied by the angle calculated for the feature points of the second object 602 and a weight corresponding to a predetermined angle section with respect to the driving direction of the autonomous vehicle, is 0.5, the autonomous driving control apparatus 100 may calculate a risk of collision with the second object 602 as "20*0.5=10".

Here, because the first angle section is closer to the driving direction than the second angle section, $W_1$ may be set to be greater than $W_2$.

Also, although not shown, the autonomous driving control apparatus 100 may calculate a risk of collision that is higher as the TTC for an object is lower.

As another example, the autonomous driving control apparatus 100 may determine whether there is a risk of collision with an object, based on whether the TTC for object exceeds a threshold value.

Figure 7:
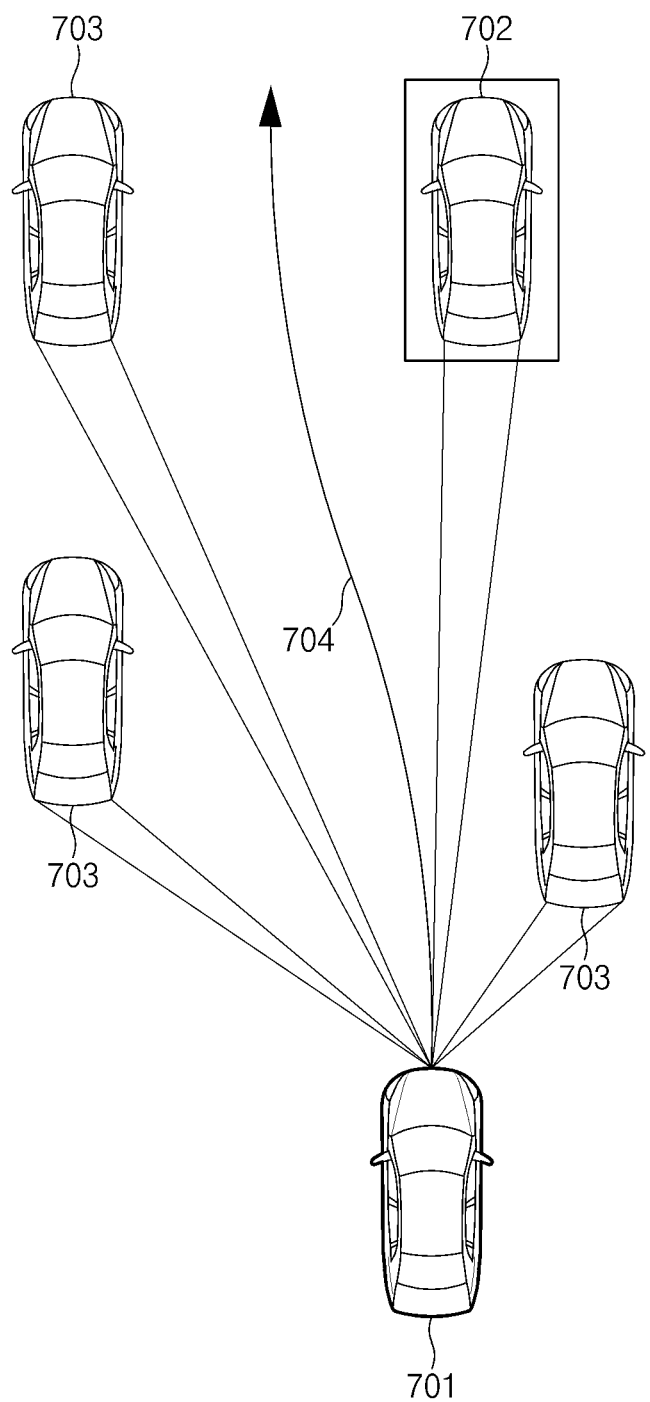
FIG. 7 is a diagram illustrating that an autonomous driving control apparatus controls autonomous driving of an autonomous vehicle, according to an embodiment of the present disclosure.

FIG. 7 is a diagram illustrating that an autonomous driving control apparatus controls autonomous driving of an autonomous vehicle, according to an embodiment of the present disclosure.

Referring to FIG. 7, the autonomous driving control apparatus 100 included in an autonomous vehicle 701 may calculate a safe route 704 so as to minimize a risk of collision with a front vehicle 702 and surrounding objects 703.

For example, while the autonomous driving control apparatus 100 modifies a driving route in real time, the autonomous driving control apparatus 100 may calculate the safe route 704 that minimizes a risk of collision with an object proportional to the product of an occupancy angle weight, which is determined depending on an angle section occupied by a feature point, and an angle between two feature points of an object.

For example, to calculate the safe route 704 that minimizes a risk of collision with an object proportional to the product of an occupancy angle weight, which is determined depending on an angle section occupied by a feature point, and an angle between two feature points of an object, while the autonomous driving control apparatus 100 modifies the driving route by a predetermined specific increment such that a risk of collision on the driving route is reduced, the autonomous driving control apparatus 100 may calculate the driving route at a point a time when the risk of collision converges, as the safe route 704.

Figure 8:
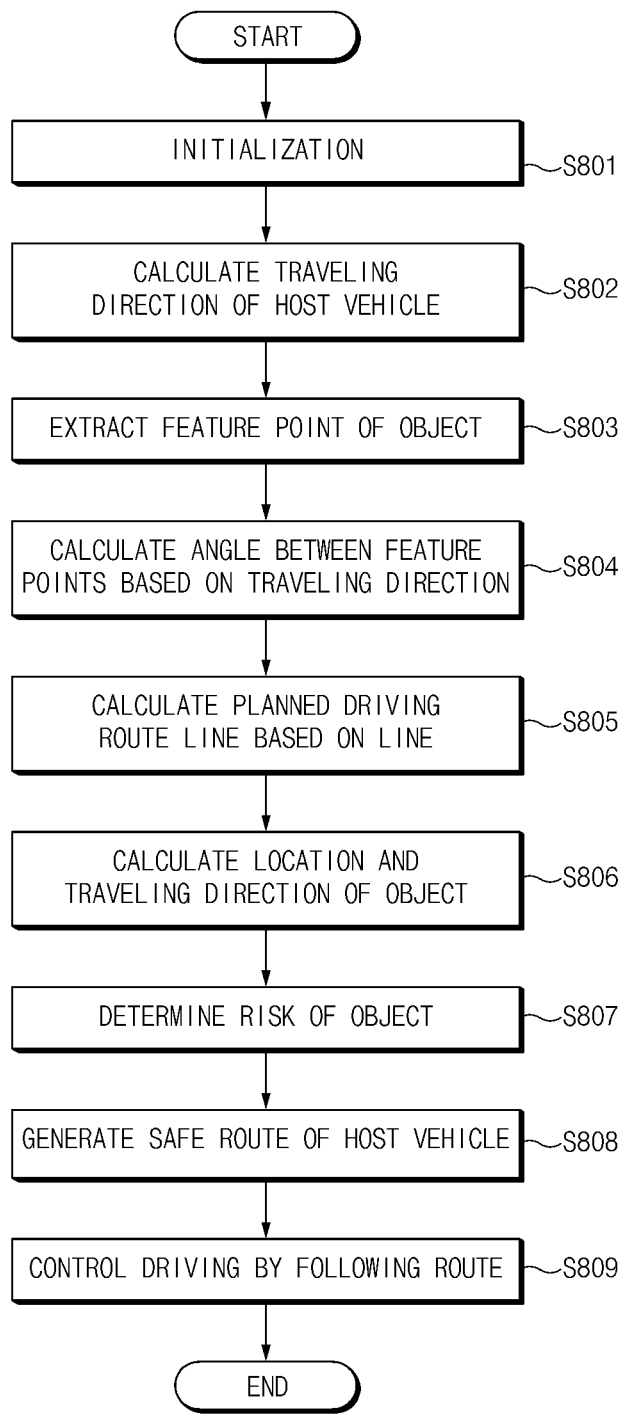
FIG. 8 is a flowchart illustrating an operation of an autonomous driving control apparatus, according to an embodiment of the present disclosure.

FIG. 8 is a flowchart illustrating an operation of an autonomous driving control apparatus, according to an embodiment of the present disclosure.

Referring to FIG. 8, the autonomous driving control apparatus 100 may initialize pieces of information calculated in a previous feature point-based autonomous driving control (S801).

For example, the autonomous driving control apparatus 100 may initialize information about a feature point, a reference line, a safe route, a weight, a surrounding line, and the like, which are calculated in the previous feature point-based autonomous driving control.

The autonomous driving control apparatus 100 may initialize pieces of information calculated in the previous feature point-based autonomous driving control (S801) and then may calculate the traveling direction of a host vehicle (S802).

For example, the autonomous driving control apparatus 100 may calculate the traveling direction of the host vehicle based on line information obtained through a camera or precise map information.

The autonomous driving control apparatus 100 may calculate the traveling direction of the host vehicle (S802) and then may extract a feature point of an object (S803).

For example, the autonomous driving control apparatus 100 may extract the feature point determined to be easy to trace and to uniquely identify an object.

The autonomous driving control apparatus 100 may extract the feature point of the object (S803) and then may calculate an angle between the feature points based on the traveling direction (S804).

For example, the autonomous driving control apparatus 100 may extract feature points of two or more objects and then may calculate an angle between the two or more feature points based on a current location of the host vehicle or a point on a planned driving route line of an autonomous vehicle.

The autonomous driving control apparatus 100 may calculate the angle between the feature points based on the traveling direction (S804) and then may calculate a planned driving route line based on a line (S805).

For example, the autonomous driving control apparatus 100 may calculate a planned driving route line corresponding to the traveling direction of the host vehicle calculated based on the line.

The autonomous driving control apparatus 100 may calculate the planned driving route line based on the line (S805) and then may calculate the location and traveling direction of the object (S806).

For example, the autonomous driving control apparatus 100 may calculate the location and traveling direction of the object based on the planned driving route line and the angle between two or more feature points calculated with respect to the host vehicle.

The autonomous driving control apparatus 100 may calculate the location and traveling direction of the object (S806), and then may determine a risk of the object (S807).

For example, the autonomous driving control apparatus 100 may determine the risk of the object in consideration of TTC for the object.

For example, the autonomous driving control apparatus 100 may determine the risk of the object based on an angle between two or more feature points and an occupancy angle weight corresponding to a section occupied by an angle between the host vehicle and the feature point of the object.

The autonomous driving control apparatus 100 may determine the risk of the object (S807) and then may generate a safe route of the host vehicle (S808).

For example, the autonomous driving control apparatus 100 may generate a safe route of the host vehicle that minimizes a risk.

The autonomous driving control apparatus 100 may generate the safe route of the host vehicle (S808) and then may control autonomous driving by following a route (S809).

For example, the autonomous driving control apparatus 100 may generate a speed profile of the generated safe route of the host vehicle, and may control autonomous driving according to the safe route and the speed profile.

Figure 9:
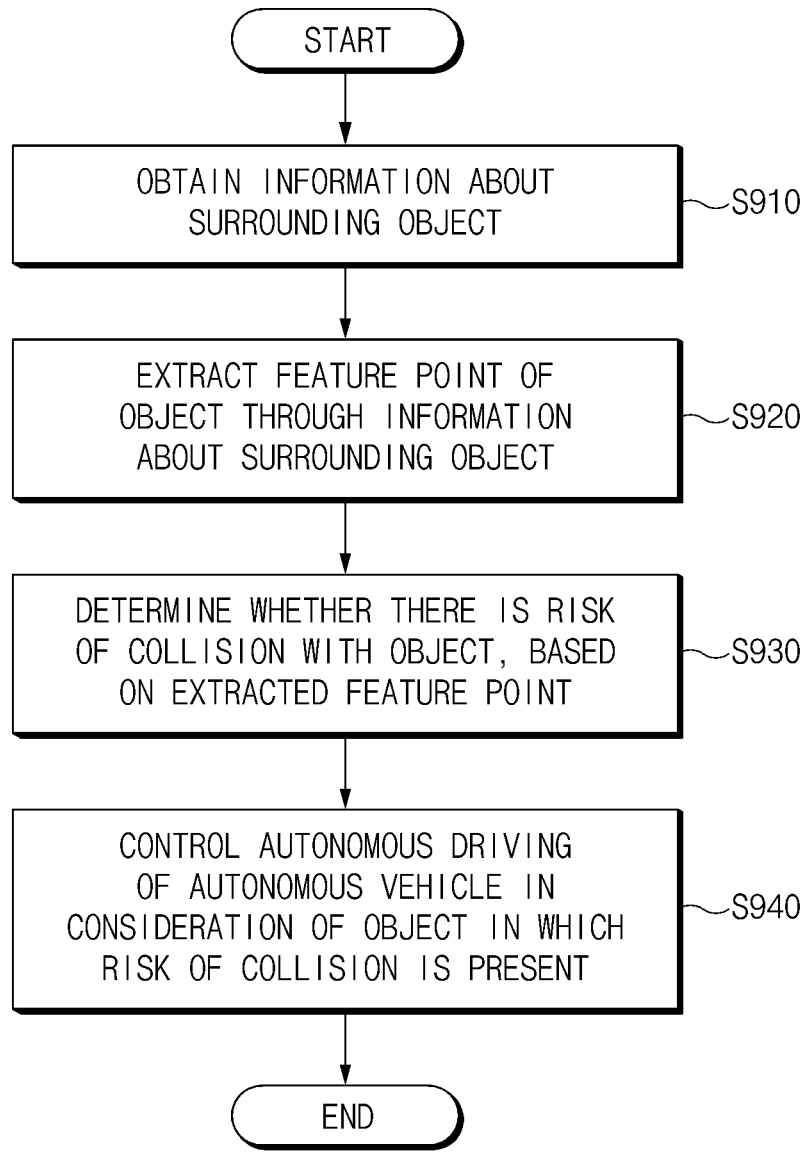
FIG. 9 is a flowchart illustrating an autonomous driving control method, according to an embodiment of the present disclosure.

FIG. 9 is a flowchart illustrating an autonomous driving control method, according to an embodiment of the present disclosure.

Referring to FIG. 9, an autonomous driving control method may include obtaining information about a surrounding object (S910), extracting a feature point of the object through the information about the surrounding object (S920), determining whether there is a risk of collision with the object, based on the extracted feature point (S930), and controlling autonomous driving of an autonomous vehicle in consideration of the object in which the risk of collision is present (S940).

The obtaining (S910) of the information about the surrounding object may be performed by the sensors 110 and 210 including at least one of a camera, lidar, or radar.

The extracting (S920) of the feature point of the object through the information about the surrounding object may be performed by the controllers 120 and 220.

For example, the extracting (S920) of the feature point of the object through the information about the surrounding object may include extracting, by the controller (120, 220), two or more feature points corresponding to the object.

For example, the extracting (S920) of the feature point of the object through the information about the surrounding object may include extracting, by the controller (120, 220), feature points of an object through the information about the object based on displacement over time of the feature points, such that the feature points, which are determined to be easy to trace and which are uniquely identified, are selected.

The determining (S930) of whether there is the risk of collision with the object, based on the extracted feature point may be performed the controller (120, 220).

For example, the determining (S930) of whether there is the risk of collision with the object, based on the extracted feature point may include calculating, by the controller (120, 220), an angle between the two or more feature points based on a current location of the autonomous vehicle or a point on a planned driving route line of the autonomous vehicle and determining, by the controller (120, 220), of whether there is the risk of collision with the object, based on the calculated angle.

For example, the determining (S930) of whether there is the risk of collision with the object, based on the extracted feature point may include calculating, by the controller (120, 220), an occupancy angle weight based on a weight corresponding to a predetermined angle section with respect to a driving direction of the autonomous vehicle and a section occupied by the calculated angle, at the current location of the autonomous vehicle or at the point on the planned driving route line of the autonomous vehicle and determining, by the controller (120, 220), whether there is the risk of collision with the object, based on the occupancy angle weight and the calculated angle.

For example, the calculating, by the controller (120, 220), of the occupancy angle weight may include calculating, by the controller (120, 220), a weight corresponding to one predetermined angle section as the occupancy angle weight when the section occupied by the calculated angle is included in the one predetermined angle section and calculating, by the controller (120, 220), a weight corresponding to a predetermined angle section including a line bisecting an angle between the two or more feature points as the occupancy angle weight with respect to the current location of the autonomous vehicle or the point on the planned driving route line of the autonomous vehicle, when the section occupied by the calculated angle spans two or more predetermined angle sections.

For example, the determining, by the controller (120, 220), of whether there is the risk of collision with the object, based on the occupancy angle weight and the calculated angle may include determining, by the controller (120, 220), the object, of which the risk of collision calculated based on the occupancy angle weight and the calculated angle exceeds a threshold value and of which TTC is less than a threshold time, as an object in which the risk of collision is present.

For example, the determining (S930) of whether there is the risk of collision with the object, based on the extracted feature point may include determining, by the controller (120, 220), whether the object is an object in which the risk of collision is present, in consideration of TTC for the object.

For example, the determining (S930) of whether there is the risk of collision with the object, based on the extracted feature point may include determining, by the controller (120, 220), whether the object is an object with a risk of collision, depending on the risk calculated based on an angle between two or more feature points and a weight corresponding to an angle between the reference line and a line connecting the object's feature point to the autonomous vehicle.

The controlling (S940) of the autonomous driving of the autonomous vehicle in consideration of the object in which the risk of collision is present may be performed by the controller (120, 220).

For example, the autonomous driving control method may further include controlling, by the controller (120, 220), autonomous vehicle's autonomous driving by generating an autonomous route that minimizes the risk of collision with the object calculated based on the occupancy angle weight and the calculated angle.

The operations of the method or algorithm described in connection with the embodiments disclosed in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Descriptions of an autonomous driving control apparatus according to an embodiment of the present disclosure, and a method thereof are as follows.

According to at least one of embodiments of the present disclosure, it is possible to provide an autonomous driving control apparatus that controls autonomous driving based on feature points of another vehicle, and a method thereof.

Furthermore, according to at least one of embodiments of the present disclosure, it is possible to provide an autonomous driving control apparatus that solves an issue in which existing dynamics information and precise map matching information disappear and normal determination is not made when objects in the blind spot of a LiDAR sensor or in an area adjacent to the blind spot are separated or merged with each other, and a method thereof.

Moreover, according to at least one of embodiments of the present disclosure, it is possible to provide an autonomous driving control apparatus, which is capable of controlling autonomous driving along a safe route in response to driving in cases where it is impossible to rely on a precise map, for example, a free space, a construction/accident section, and the like, and a method thereof.

Besides, according to at least one of embodiments of the present disclosure, it is possible to provide an autonomous driving control apparatus, which performs autonomous driving by reducing complex calculations without using precise map matching and quickly responding to emergency situations, or the like without delay, and a method thereof.

Also, according to at least one of embodiments of the present disclosure, it is possible to provide an autonomous driving control apparatus, which complementarily enhance the completeness of autonomous driving by combining the existing autonomous driving logic, a method thereof.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. An autonomous driving control apparatus comprising:
a sensor included in an autonomous vehicle and configured to obtain information about a surrounding object; and
a controller configured to:
extract one or more feature points corresponding to the surrounding object through the information about the surrounding object;
determine whether there is a risk of collision with the surrounding object, based on the extracted feature point; and
control autonomous driving of the autonomous vehicle based on a determined result of the risk of collision with the surrounding object,
wherein the controller is further configured to:
extract two or more feature points, which correspond to the surrounding object, from among the one or more feature points; and
determine whether there is the risk of collision with the surrounding object, based on a weight corresponding to a predetermined angle section with respect to a driving direction of the autonomous vehicle and a calculated angle between the two or more feature points.

2. The autonomous driving control apparatus of claim 1, wherein the controller is configured to:
calculate the angle between the two or more feature points based on a current location of the autonomous vehicle or a point on a planned driving route line of the autonomous vehicle.

3. The autonomous driving control apparatus of claim 1, wherein the controller is configured to:
extract the one or more feature points of the surrounding object through the information about the surrounding object based on an extent of displacement of the one or more feature points over time and whether the one or more feature points are uniquely identified.

4. The autonomous driving control apparatus of claim 1, wherein the sensor obtains the information about the surrounding object through at least one sensor among a camera, a lidar, or a radar.

5. The autonomous driving control apparatus of claim 1, wherein the controller is configured to:
extract the one or more feature points of the surrounding object by fusing the information about the surrounding object obtained through two or more sensors included in the sensor.

6. The autonomous driving control apparatus of claim 1, wherein the controller is configured to:
calculate an occupancy angle weight based on the weight corresponding to the predetermined angle section and a section occupied by the calculated angle, at a current location of the autonomous vehicle or at a point on a planned driving route line of the autonomous vehicle; and
determine whether there is the risk of collision with the surrounding object, based on the occupancy angle weight and the calculated angle.

7. The autonomous driving control apparatus of claim 6, wherein the controller is configured to:
calculate a weight corresponding to one predetermined angle section as the occupancy angle weight when the section occupied by the calculated angle is included in the one predetermined angle section; and
calculate a weight corresponding to a predetermined angle section including a line bisecting an angle between the two or more feature points as the occupancy angle weight with respect to the current location of the autonomous vehicle or the point on the planned driving route line of the autonomous vehicle, when the section occupied by the calculated angle spans two or more predetermined angle sections.

8. The autonomous driving control apparatus of claim 6, wherein the controller is configured to:
determine whether there is the risk of collision with the surrounding object, based on a value obtained by multiplying the occupancy angle weight and the calculated angle.

9. The autonomous driving control apparatus of claim 2, wherein the controller is configured to:
calculate the angle between the two or more feature points based on a state where the autonomous vehicle is away from the surrounding object by a specific distance to the surrounding object on the planned driving route line.

10. The autonomous driving control apparatus of claim 1, wherein the controller is configured to:
determine whether the surrounding object is an object in which the risk of collision is present, in consideration of time to collision (TTC) for the object.

11. The autonomous driving control apparatus of claim 6, wherein the controller is configured to:
determine that the surrounding object, of which the risk of collision calculated based on the occupancy angle weight and the calculated angle exceeds a threshold value and of which time to collision (TTC) is less than a threshold time, is an object in which the risk of collision is present.

12. The autonomous driving control apparatus of claim 6, wherein the controller is configured to:
control autonomous driving of the autonomous vehicle by generating an autonomous route that minimizes the risk of collision of the surrounding object calculated based on the occupancy angle weight and the calculated angle.

13. An autonomous driving control method, the method comprising:
obtaining, by a sensor provided in an autonomous vehicle, information about a surrounding object;
extracting, by a controller, one or more feature points corresponding to the surrounding object through the information about the surrounding object;
determining, by the controller, whether there is a risk of collision with the surrounding object, based on the extracted feature points; and
controlling, by the controller, autonomous driving of the autonomous vehicle based on a determined result of the risk of collision with the surrounding object,
wherein extracting the one or more feature points corresponding to the surrounding object includes:
extracting, by the controller, two or more feature points, which correspond to the surrounding object, from among the one or more feature points, and
wherein determining whether there is the risk of collision with the surrounding object based on the extracted feature points includes:
determining, by the controller, whether there is the risk of collision with the surrounding object, based on a weight corresponding to a predetermined angle section with respect to a driving direction of the autonomous vehicle and a calculated angle between the two or more feature points.

14. The method of claim 13, further comprising:
calculating, by the controller, the angle between the two or more feature points based on a current location of the autonomous vehicle or a point on a planned driving route line of the autonomous vehicle.

15. The method of claim 13, wherein the extracting of the one or more feature points corresponding to the surrounding object through the information about the surrounding object includes:
extracting, by the controller, the one or more feature points of the surrounding object through the information about the surrounding object based on an extent of displacement of the one or more feature points over time and whether the one or more feature points are uniquely identified.

16. The method of claim 13, wherein determining whether there is the risk of collision with the surrounding object based on the weight corresponding to the predetermined angle section with respect to the driving direction of the autonomous vehicle and the calculated angle between the two or more feature points includes:
calculating, by the controller, an occupancy angle weight based on the weight corresponding to the predetermined angle section and a section occupied by the calculated angle, at a current location of the autonomous vehicle or at a point on a planned driving route line of the autonomous vehicle; and
determining, by the controller, whether there is the risk of collision with the surrounding object based on the occupancy angle weight and the calculated angle.

17. The method of claim 16, wherein the calculating of the occupancy angle weight includes:
calculating, by the controller, a weight corresponding to one predetermined angle section as the occupancy angle weight when the section occupied by the calculated angle is included in the one predetermined angle section; and calculating, by the controller, a weight corresponding to a predetermined angle section including a line bisecting an angle between the two or more feature points as the occupancy angle weight with respect to the current location of the autonomous vehicle or the point on the planned driving route line of the autonomous vehicle, when the section occupied by the calculated angle spans two or more predetermined angle sections.

18. The method of claim 13, wherein the determining of whether there is the risk of collision with the surrounding object based on the weight corresponding to the predetermined angle section with respect to the driving direction of the autonomous vehicle and the calculated angle between the two or more feature points includes:

determining, by the controller, whether the surrounding object is an object in which the risk of collision is present, in consideration of time to collision (TTC) for the surrounding object.

19. The method of claim 16, wherein the determining of whether there is the risk of collision with the surrounding object based on the occupancy angle weight and the calculated angle includes:

determining, by the controller, the surrounding object, of which the risk of collision calculated based on the occupancy angle weight and the calculated angle exceeds a threshold value and of which time to collision (TTC) is less than a threshold time, as an object in which the risk of collision is present.

20. The method of claim 16, further comprising:

controlling, by the controller, autonomous driving of the autonomous vehicle by generating an autonomous route that minimizes the risk of collision of the surrounding object calculated based on the occupancy angle weight and the calculated angle.

* * * * *